A. B. B. HARRIS.
RAIL FASTENING.
APPLICATION FILED AUG. 12, 1912.
1,096,301.
Patented May 12, 1914.
4 SHEETS—SHEET 1.
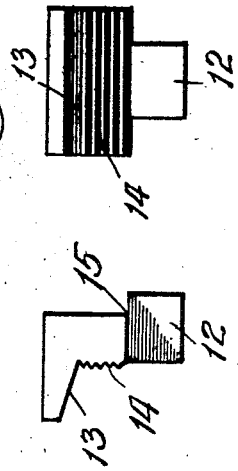
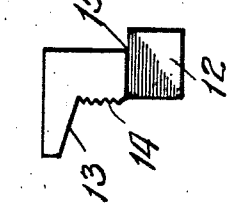
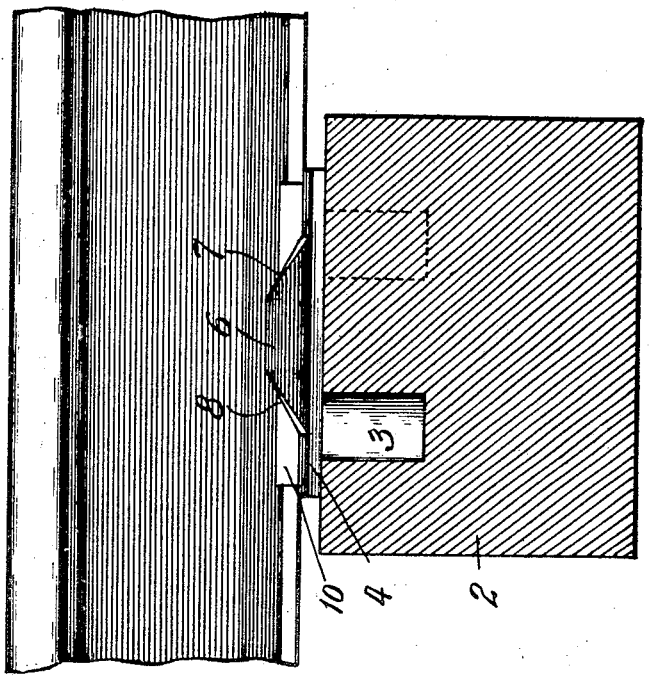
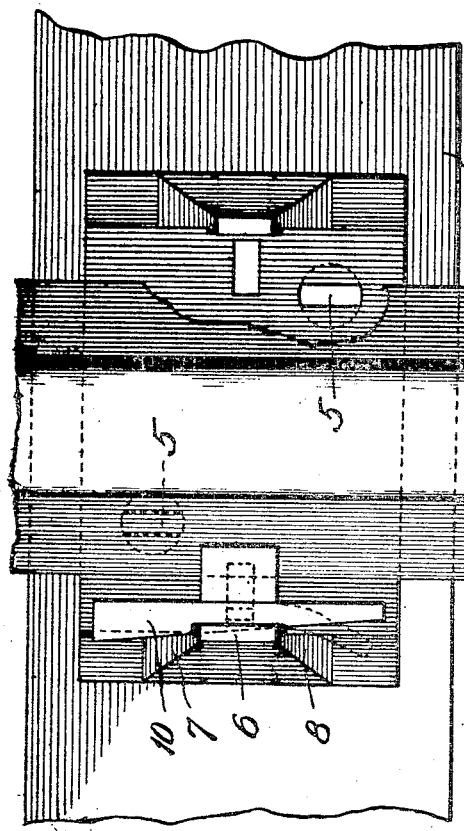
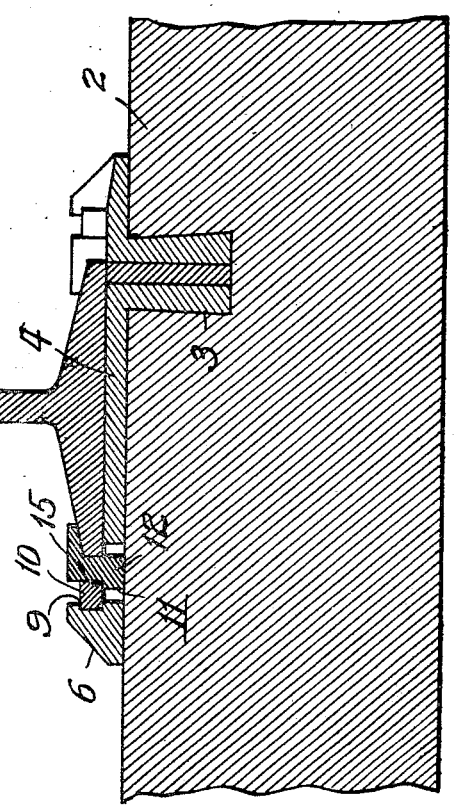
Witnesses:
John Enders
J. V. Curran
Inventor:
Alexander B. B. Harris,
by Wallace R. Lane
Atty.

A. B. B. HARRIS.
RAIL FASTENING.
APPLICATION FILED AUG. 12, 1912.
1,096,301.
Patented May 12, 1914.
4 SHEETS—SHEET 2.
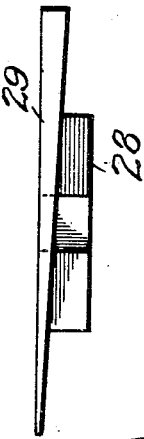
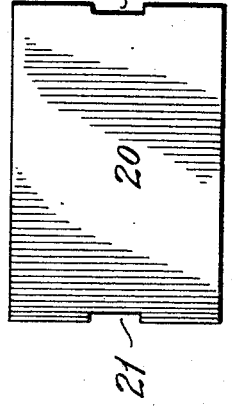
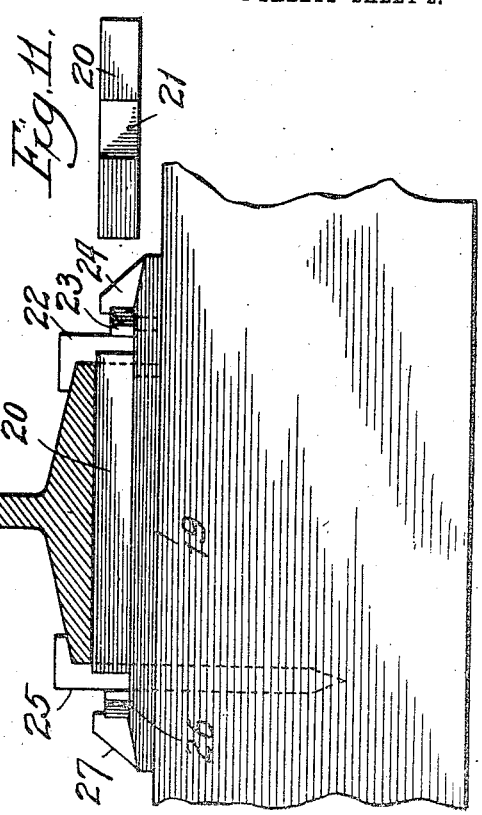
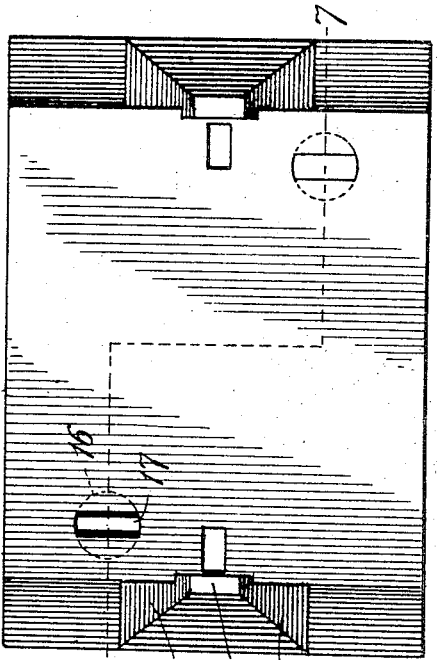
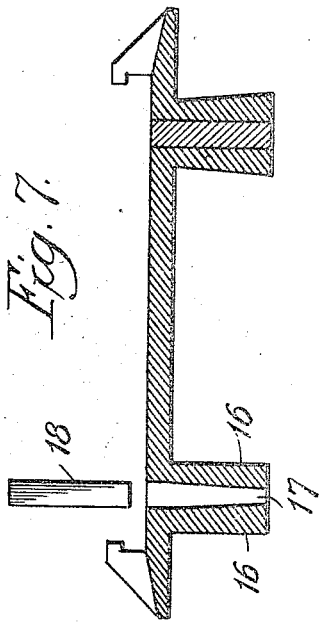
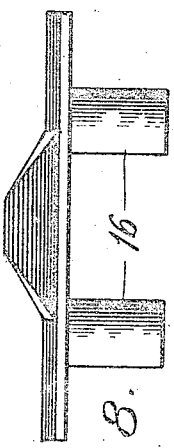
Witnesses:
John Enders
J. V. Curran.
Inventor:
Alexander B. B. Harris,
by Wallace R. Lane
Atty.

A. B. B. HARRIS.
RAIL FASTENING.
APPLICATION FILED AUG. 12, 1912.
1,096,301.
Patented May 12, 1914.
4 SHEETS—SHEET 3.
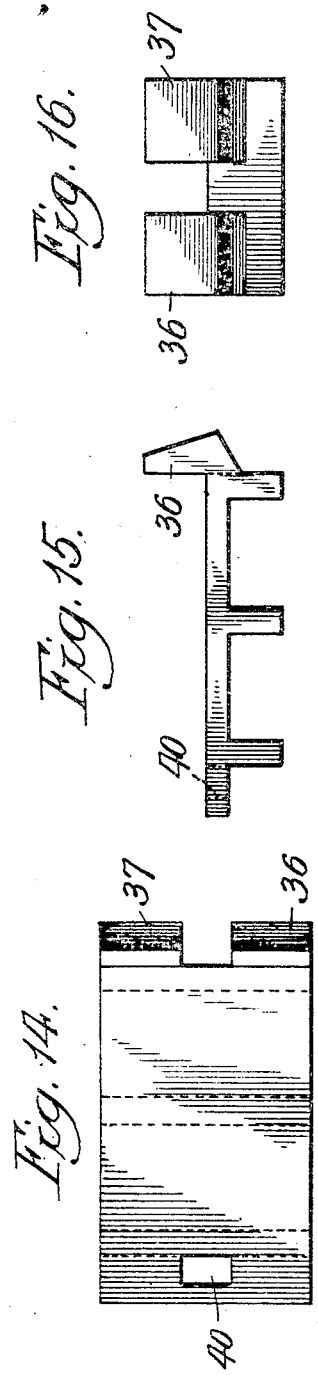
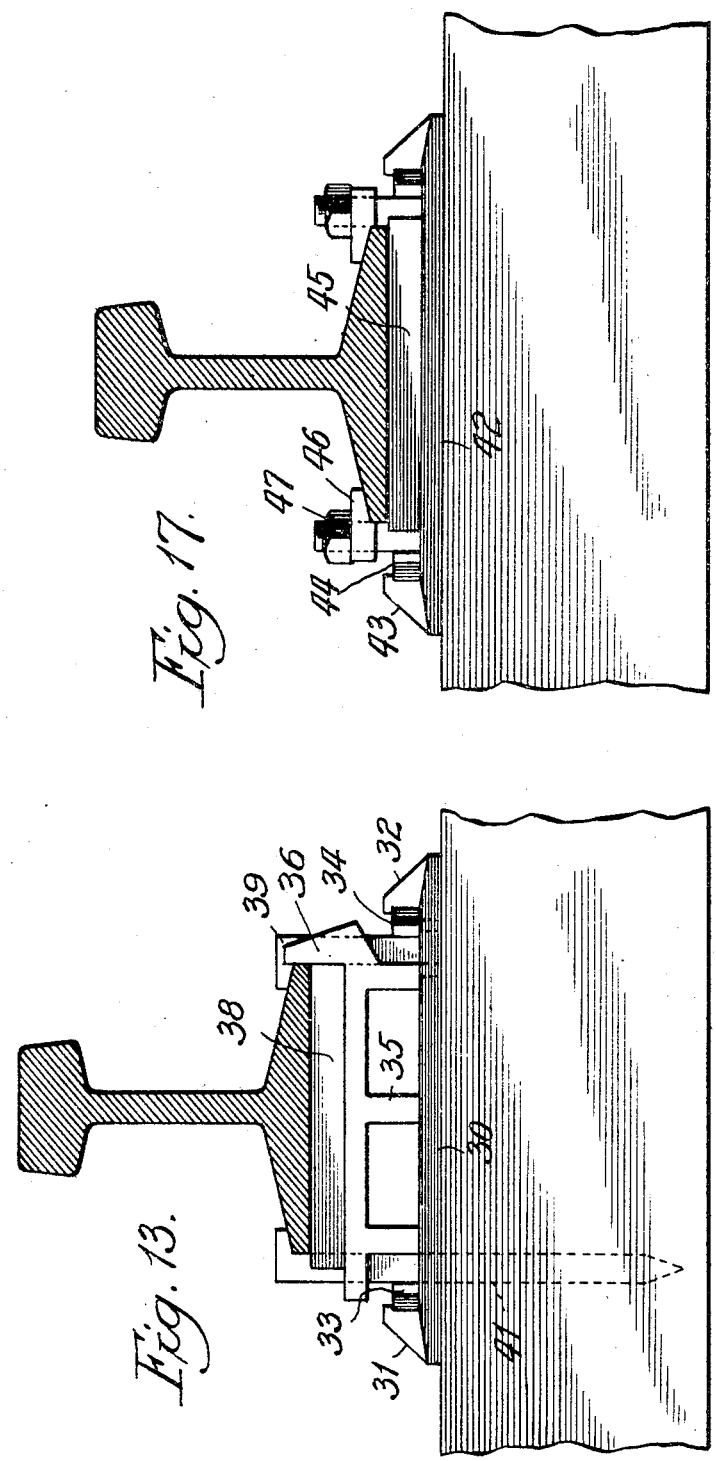
Witnesses:
John Enders
J. V. Curran.
Inventor:
Alexander B. B. Harris,
by Wallace R. Lane
Atty.

A. B. B. HARRIS.
RAIL FASTENING.
APPLICATION FILED AUG. 12, 1912.
1,096,301.
Patented May 12, 1914.
4 SHEETS—SHEET 4.
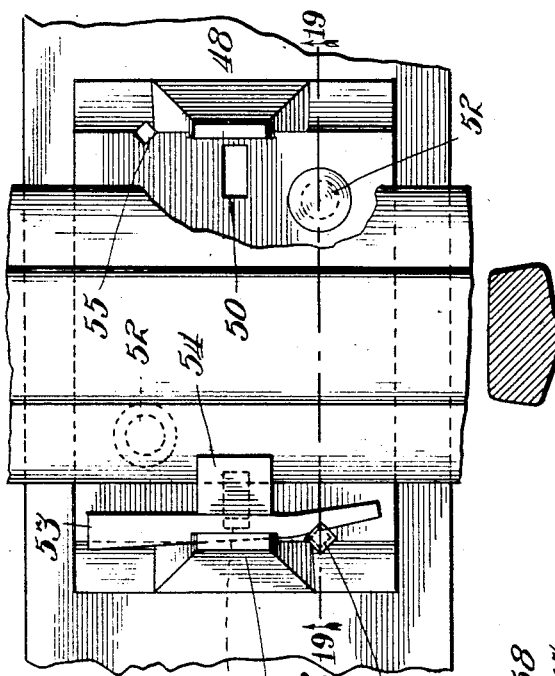
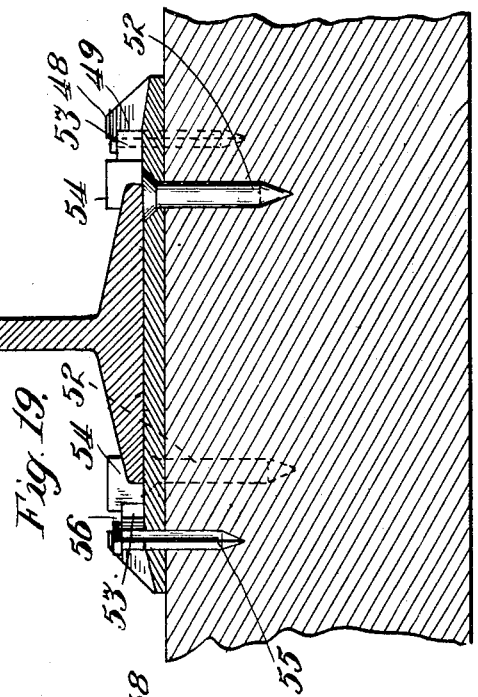
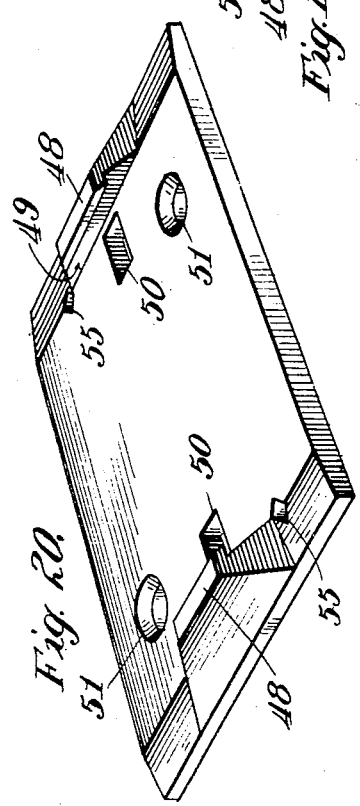
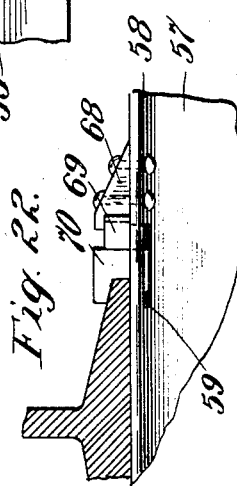
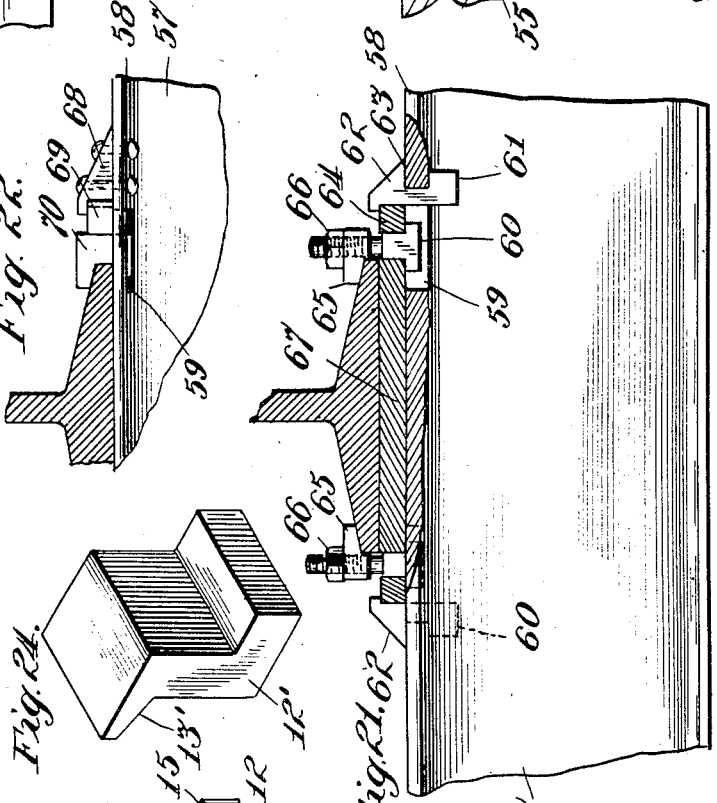
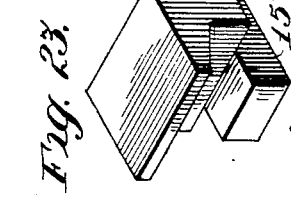
Witnesses:
Milton Lenoir
J. V. Curran
Inventor:
Alexander B. B. Harris.
By Wallace R. Lane,
Attorney.

UNITED STATES PATENT OFFICE.

ALEXANDER B. B. HARRIS, OF CHICAGO, ILLINOIS.

RAIL-FASTENING.

1,096,301.  Specification of Letters Patent.  Patented May 12, 1914.

Application filed August 12, 1912. Serial No. 714,543.

*To all whom it may concern:*

Be it known that I, ALEXANDER B. B. HARRIS, a citizen of the United States, residing at Chicago, in the county of Cook and State of Illinois, have invented new and useful Improvements in Rail-Fastenings, of which the following is a specification.

Among the objects of the present invention are the anchorage of plates to ties in such a way as to eliminate any possible movement between tie and plate, thereby reducing to a minimum the mechanical wear of a tie; eliminating any openings in the tie which would admit moisture and cause early decay; preventing spreading of the rails; giving an accurate rail bearing, thereby reducing the liability of rail failure through uneven bearing of the rail on the tie or plate; insuring a true gage and providing for gage adjustment, as on curves when made necessary by rail wear, this adjustment being secured without moving the plate; providing means to prevent rail creeping, protecting the spike heads or other fastening devices from the shearing action of derailed wheels; providing for replacing rails with other rails of different sections without moving the plates or tie and without re-spiking the tie; and providing for spike lining and shimming without moving the plate and without re-spiking.

The details of my invention will be better understood by reference to the following description, taken in conjunction with the accompanying drawings, wherein—

Figure 1 is a plan of rail fastening. Fig. 2 is a sectional elevation of the structure shown in Fig. 1. Fig. 3 is a side elevation of the same. Figs. 4 and 5 are details of the anchor plate. Fig. 6 is a plan view of the tie-plate only. Figs. 7 and 8 are respectively a sectional elevation and a side elevation of the plates shown in Fig. 6. Fig. 9 is an elevation of a form wherein the rail holding plates are tall enough to admit a shim under the rail base. Fig. 10 is a plan view of the shim. Fig. 11 is a side view of the shim. Fig. 12 is a modified two-part shim. Fig. 13 illustrates the shimmed rail carried on a frame to increase the height of the rail above the tie. Figs. 14, 15 and 16 are details of the shim supporting frame. Fig. 17 illustrates a modification wherein the rail holding plates are vertically adjustable on screw-threaded anchors to permit change in the thickness of the shim, this being the preferred form when shims are used. Fig. 18 illustrates a modified form of tie-plate anchored by means of removable pins seated in the tie. Fig. 19 is a sectional elevation of the same. Fig. 20 is a perspective view of the tie-plate only. Fig. 21 shows an adjustable fastening of the wedge type suitable for the reception of a wood shim under the rail and detachably secured to the upper face of a steel tie. Fig. 22 shows another method of attaching the retaining lugs to a steel tie. Figs. 23 and 24 show modified forms of rail retaining plates.

In Fig. 1 the wooden tie 2 is provided at its surfaced top with a plurality of bored holes adapted to receive the projecting lugs 3 carried on the under face of the tie-plate 4. This plate may be of malleable iron or of rolled metal and has a plurality of openings 5 into which pins or blocks can be driven to separate the lower enlarged ends of the projections 3 into tight engagement with the sides of the bored holes in the tie. At each end of the tie plate is an upstanding integral lug 6 braced on each side by inclined reinforcements 7 and 8 (Fig. 3) and under-cut at 9 to receive a tapered metal wedge 10. Immediately in front of the lug 6 is an opening 11 through the tie-plate into which fits, with a sliding movement, the lower end 12 of an anchor plate of the shape illustrated in Figs. 4 and 5, or of the modified forms shown in Figs. 23 and 24. Each anchor plate has a projecting face 13 adapted to overlap and grip the base of a rail and may be serrated at 14 to increase the holding power on the rail and to prevent creeping or longitudinal movement of the rail. In general it is desirable to use the serrated type of plate only on the inside of the rail and to use a plate on the outside of the rail unprovided with serrations or in other words smooth along the face at 14, Fig. 4. The anchors are also provided with a shoulder at 15 for engagement with the wedge 10. This wedge serves, not only to hold the anchors against upward movement, but pushes them sidewise tightly against the base of the rail. The anchoring plates and wedges on opposite sides of the rail are identical in construction, but reversed so far as concerns the direction in which the wedge is driven.

In case the rail is to be moved sidewise, as to correct rail wear on curves, and the like, one of the wedges 10 can be slightly withdrawn and the other wedge can be driven farther in, thereby producing corresponding movement in the anchor plates and shifting the rail sidewise over the face of the tie-plate. There need be no unspiking of the tie-plates and no movement of the plates with respect to the ties, these plates being at all times immovably secured to the tie by the wedging blocks 5 so positioned under the rail that they cannot work upward. The anchor plates, which in this construction take the place of spikes in holding the rail in position, are protected by the lugs 6 and are not liable to breakage in case a derailed wheel drops down and runs along at the base of the rail. Even when soft wood ties are used the firm anchorage secured by the tapered projections 3 eliminates the necessity for putting hard wood blocks into the ties to hold the spikes.

In the modified form illustrated in Fig. 23, the lower end 12 of the anchor plate is extended not only backward to form a wedge engaging face at 15 but also forward at 15′ to form a lug which lies under the base of the rail and may contact therewith. It is the function of this forwardly projecting lug 15′ to prevent complete withdrawal of the anchor plate by persons maliciously tampering with the structure. The lug 15′ prevents withdrawal of the anchor plate until after the rail itself has been lifted a short distance above the tie-plate.

The modified structure shown in Fig. 24 resembles the anchor plate of Figs. 4 and 5 except that it has a lower portion 12′ of the same width as its holding face 13′ or in other words, is not cut away at the sides as in the structure shown in Fig. 5. With this wide type of anchor plate the slot of the tie-plate wherein the sliding movement takes place must of necessity be widened to correspond.

In case it becomes necessary to replace the rails of Fig. 1 by rails of different section or different weight, this change can be made by suitable adjustment of the wedges 10 or varying the thickness of the anchor plates and without removing the plate or the tie and without re-spiking the plate on the tie. For this reason it is possible to have the ties bored in a standard way with the certainty that they will fit rails of different sections.

Figs. 6, 7 and 8 illustrate the feature of securing a tie-plate to a tie through the wedging action of projections 16 carried on the lower face of the plate and spaced apart at 17 to permit the insertion of a spreader block or pin 18, which when it comes into position as shown in Fig. 7, separates the lugs or projections 16 and locks them securely in the tie.

In the practical operation of railroads, it is often desirable temporarily to raise the rails with respect to the ties, by inserting shims under the rails. This is frequently necessary to cure settling or heaving of the ground during changes of weather.

Fig. 9 is a modification of my present invention wherein the tie-plate 19, of the general form described in connection with Fig. 2 and anchored to the tie in any suitable manner, is provided with a shim plate 20 of the form illustrated in Fig. 10 and used to lift the rail a short distance above the tie. The shim plate may be of metal and preferably is cut away or notched on each side at 21 to embrace the sides of the anchor 22, which in this modification is somewhat taller than the anchor of Fig. 2, but in other respects is the same, being held securely against the rail by the tapered wedge piece 23 held in position by the under cut lug 24.

In certain special positions as for instance on the outside of curves and the like, the anchor member 22 may be replaced by a long spike 25 driven into the tie but stiffened and supported laterally and also firmly anchored by a wedge block 26 and a supporting lug 27. If desired the flat shim plate 20 may be replaced by an adjustable shim made up of two tapered plates 28 and 29 as illustrated in Fig. 12, the plate 29 being disposed lengthwise of the rail and in contact therewith.

In case the rail is to be lifted by shimming to such a height that considerable anchorage is necessary, the structure illustrated in Fig. 13 may be used. This structure comprises a tie-plate 30 anchored to the tie in suitable manner and provided with lugs 31 and 32 and wedges 33 and 34 and surmounted by a frame 35 preferably of skeleton form, with side lugs 36 and 37 extending upward beyond the shim 38 and engaging the side of the rail base giving it lateral support and also protecting the head of the anchor plate 39 in case of derailment. This anchor plate 39 corresponds in general function to the anchor plate 22 of Fig. 9 and is held down by the wedge piece 34. The opposite end of the supporting frame 35 has a hole 40 (Fig. 14) through which a long spike 41 may be driven to give lateral support to the entire structure, this spike being held against bending strain by the frame 35 and also being reinforced by the wedge 33 and its cooperating lug 31.

The modification illustrated in Fig. 17 comprises a tie-plate 42 anchored in suitable manner and equipped with lugs 43 and wedges 44 for the purposes heretofore set forth and also if desired, being provided with a shim 45 of any suitable thickness. This modification differs from that of Fig. 9 particularly in that the tops or overhanging portions 46 of the anchor members are adjustably mounted and can be raised or lowered by unscrewing nuts 47 carried on the cylindrical and threaded top of the anchor members. Through the adjustability thereby obtained, the thickness of the shim 45 can be regulated at will, while at the same time the rail can be shifted sidewise as in the case of the structure shown in Fig. 2, merely by loosening one of the wedges and tightening up on the other. The vertical adjustment is a desirable feature of this modification for it permits rail adjustment when the ground is frozen and the ties are immovable. The shim cannot work loose because of its notched engagement with the rail holding members and the flexibility in rail adjustment is secured without sacrificing anything in the security of the fastening. In case shims are to be used, the modification illustrated in Fig. 17 is in many respects the preferred form.

Figs. 18, 19 and 20 are illustrative particularly of another form of tie-plate together with certain modifications in the means for securing the rail to the plate. This tie-plate as shown in Fig. 20 has integral lugs 48 which are so shaped that except for the undercutting at 49 to hold the wedge they may be made by rolling processes. The plate is provided with a pair of slots 50 for receiving the rail anchors and is also provided with a plurality of circular openings 51, Fig. 20 preferably disposed at diagonal corners of the plate and adapted to receive the countersunk heads of anchoring pins 52 (Fig. 19) which fit tightly into holes bored in the tie. Preferably these retaining pins 52 are positioned under the rail base so that there may be no danger of accidental withdrawal while the rail is in service. However, if desired the pins may be positioned outside of the base, this having the advantage of permitting replacement of the plate without removing the tie from its position under the rail or without lifting the rail from the ties.

In the modification of Fig. 18 the sliding wedge 53 which holds the rail anchor 54 is itself locked against accidental withdrawal by a pin 55 which preferably carries a head 56 which may be rectangular in cross-section as shown with one of its corners cutting into the edge of the wedge to lock it in position. The locking pin 55 fits through a suitable hole in the tie-plate and may be driven into the tie beneath. If desired this anchoring pin may be of circular cross-section but otherwise constructed and used as above explained.

In using steel ties for supporting rails there is the difficulty of adequately securing the rails to the tie and the additional difficulty arising from the heavy strains in the structure when the rail is seated directly on the steel tie. The structure illustrated in Fig. 21 provides for adequate anchorage of the rail to a steel tie and also possesses the advantage of having a wooden cushion in the nature of a shim between the base of the rail and the tie to protect the tie from hammering and consequently to protect the rail and the rolling stock from undue shock under normal conditions. In the structure of Fig. 21, the steel tie carries at the top of its central web 57 a top flange 58 slotted at 59 to receive the lower sliding end of an anchor member 60 and also receiving the lower enlarged end 61 of a lug member. The upper end 62 of this lug member is shaped much like the lugs of Fig. 2 and overlaps the top face of the tie flange at 63 sufficiently to insure secure fastening. A tapered wedge 64 is slipped in between the lug and the anchor member as in constructions previously disclosed and the rail holding projection 65 of the anchor member is adjustable vertically through movement of the nut 66 as in the construction of Fig. 17. The wooden shim 67 which may be used in this type of construction is of the general shape shown in Fig. 10 and may be a permanent part of the structure to serve as a cushion between the rail and the tie or may be used mainly as an adjusting member. If shims or cushions are not used at this point, I prefer to omit the adjustable features of the rail anchors, using instead of the nuts 66 and projections 65, the integral anchors 15 of Fig. 2. Also when the wooden strip is to be used merely as a cushion these rigid integral lugs may be employed to advantage. I am aware that cushioning means for steel ties have been suggested before but I am not aware that it has heretofore been proposed to arrange a wooden cushion on the top face of a tie as here explained holding that cushion on the tie by the rail itself in conjunction with the rail fastening means.

Instead of using the detachable lugs of Fig. 21 for engagement of the wedges, I may use lugs 68 (Fig. 22) secured to the tie flange by rivets. Such a rigidly mounted lug in conjunction with its coöperating wedge 69 and anchor member 70 are well adapted for holding a rail directly in contact with the top face of a steel tie as shown in Fig. 2 and possess the adjustable characteristics common to the structures of Figs. 2 and 18 while at the same time calling for the use of but few mechanical parts and these of simple construction and low cost.

While I have before explained the main features of the invention herein claimed, I am aware that changes may be made and reorganizations effected without departing from the spirit of my invention as defined by the appended claims.

What I claim as new and desire to secure by Letters Patent of the United States is:

1. In a rail fastening, the combination of a tie-plate, means for anchoring said tie-plate to a tie, anchor members each projecting into a slot of said tie-plate near the inner end of said slot and slidingly mounted therein, each anchor member having a forwardly projecting lug for engagement with the edge of the rail base and also having a shoulder at its lower rear end, and a comparatively thin wedge member coöperating with the shoulder of said anchor member and movable with respect thereto to shift the rails sidewise when desired.

2. In a rail fastening, the combination of a tie-plate having means for attachment to a tie, each end of said tie-plate having a slot formed therein to receive an anchor member, an undercut lug adjacent to said slot, an anchor member in each slot and having a portion shaped to engage with the rail, a wedge for each anchor member, said wedges being adjustable with respect to one another to shift said rail on said tie-plate, the free ends of said wedges being bent laterally after the wedges have been secured in place, these bent ends securely locking the wedges in place.

3. In a rail fastening, the combination of a tie-plate having means for attachment to a tie, each end of said tie-plate having a slot formed therein to receive an anchor member, an undercut lug adjacent to said slot, an anchor member in each slot and having a portion shaped to engage with the rail, a wedge for each anchor member, said wedges being adjustable with respect to one another to shift said rail on said tie-plate, the free ends of said wedges being bent laterally after the wedges have been secured in place, and a pin adapted to be secured in place on the tie-plate after each wedge has been bent the head of said pin being positioned against the bent end of said wedge thereby to securely lock the same in place.

4. In a rail fastening, the combination of a tie-plate, means for securing the tie-plate to the tie, the said tie-plate having a pair of slots formed therein, lugs projecting up from said plate adjacent the outer ends of said slots, an anchor member adapted to be placed in each slot and having a portion adapted to engage a flange of the rail, a tapered wedge member for each anchor member, a pair of projecting lugs mounted upon the tie-plate and arranged in alinement with the inner face of said first mentioned lugs, the said wedge members being adjustable and the free ends of the wedge members adapted to be bent laterally by the projecting lugs for locking the same in place.

5. In a rail fastening, the combination of a tie-plate having means for attachment to a tie, the said tie-plate being of greater width than the flange of the rail, the said tie-plate having a pair of elongated slots formed therein, an under cut lug adjacent to each slot, anchor members adapted to rest in each slot, said anchor members having a projection from one end thereof for engaging the flange of the rail, an under cut portion formed within the opposite end of the anchor members, a tapered wedge member adapted to rest between the under cut portions of the lugs and anchor members, a rectangular pin detachably secured upon the said tie-plate and arranged in alinement with the inner face of each of said lugs, the said wedge members being adjustable and the free end of said wedge members adapted to engage said rectangular pins for bending the same laterally for the purpose specified.

In witness whereof, I hereunto subscribe my name to this specification in the presence of two witnesses.

ALEXANDER B. B. HARRIS.

Witnesses:
  I. V. CURRAN,
  ARBA B. MARVIN.